Aug. 18, 1936.    H. SARRAZIN    2,051,496
DRIVE MECHANISM FOR MOTOR VEHICLES
Filed April 18, 1934    2 Sheets-Sheet 1
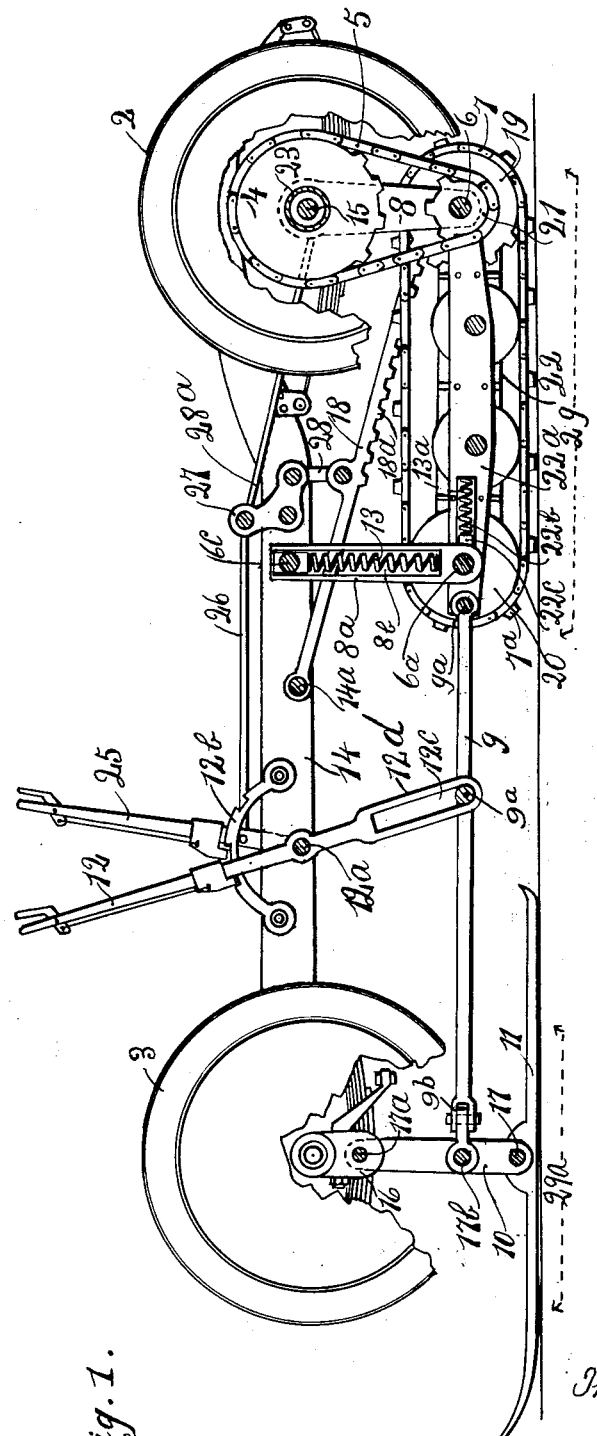
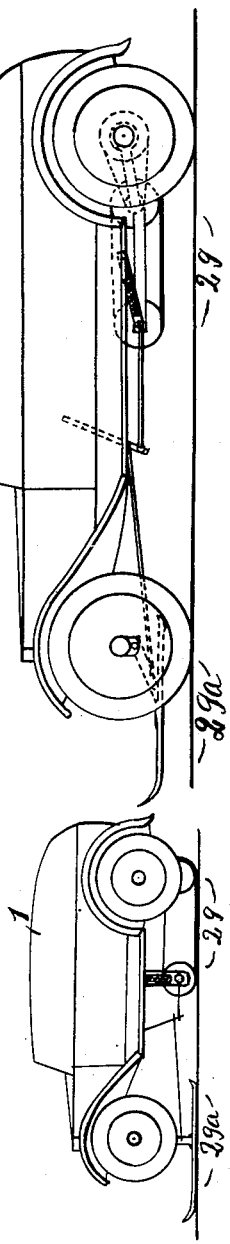
Inventor
H. Sarrazin.

Aug. 18, 1936.    H. SARRAZIN    2,051,496
DRIVE MECHANISM FOR MOTOR VEHICLES
Filed April 18, 1934    2 Sheets-Sheet 2
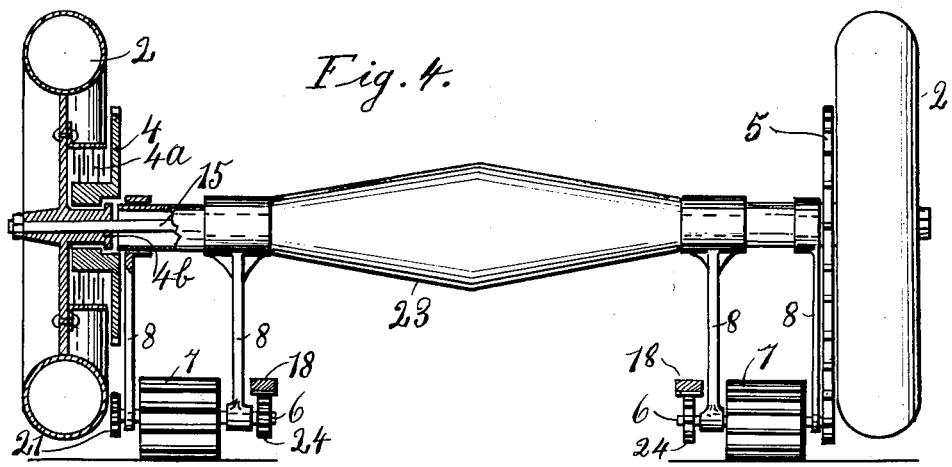
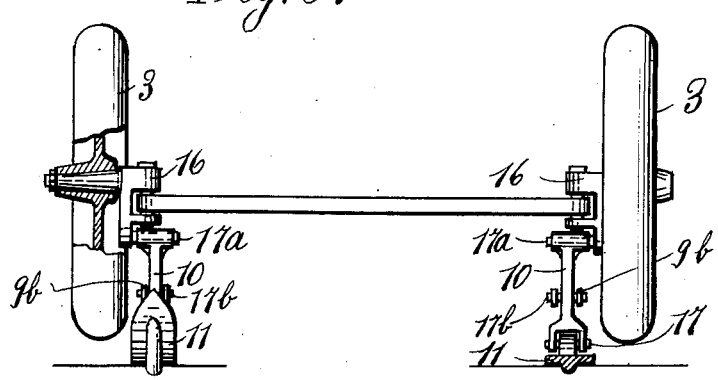
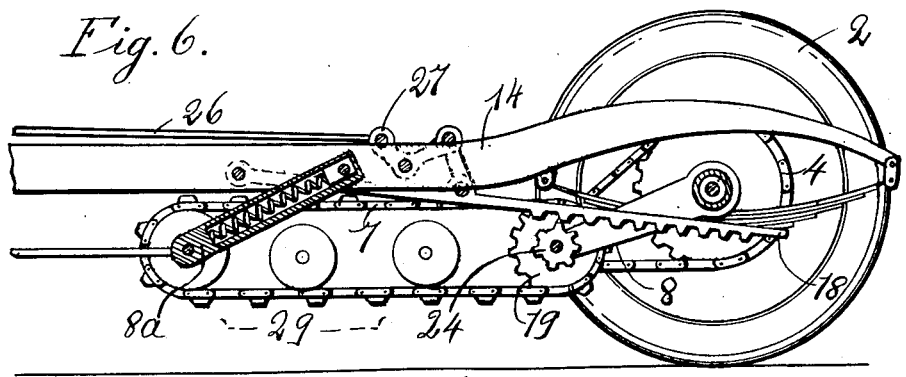
Inventor
H. Sarrazin.

Patented Aug. 18, 1936

2,051,496

UNITED STATES PATENT OFFICE 2,051,496

DRIVE MECHANISM FOR MOTOR VEHICLES

Henry Sarrazin, Prince Albert, Saskatchewan, Canada

Application April 18, 1934, Serial No. 721,138

1 Claim. (Cl. 180—5)

The present invention relates to an auxiliary drive mechanism, intended to be adapted to motor vehicles, having propelling means in the form of two endless traction tracks disposed under the vehicle at a reasonable distance from the ground, with means for forcing the said tracks downwardly against the ground to secure effective traction when the condition of roads are such that the driving wheels begin to slip.

Another object of my invention is to provide a pair of runners, mounted under the front axle of the vehicle, at a certain distance from the ground and lowered when required.

Another object of my invention is to provide a drive mechanism of the class described that will be easy to operate and promptly swung to any position required to propel the vehicle in the most effective manner over the various and ever changing road conditions.

Another object of my invention is that the changing of the drive mechanism from one or the other of its respective positions may be effected either manually or by power derived from the vehicle's motor.

A further object in view is to provide a drive mechanism, that will be almost out of sight when not in operation, whereby the appearance of the vehicle will not be affected.

These and other objects and advantages of my invention will be more fully set forth in the following description made in connection with the accompanying drawings, in which like reference characters refer to similar parts throughout the several views, and in which:—

Fig. 1 is a side elevation of a motor vehicle chassis showing the drive mechanism mounted under the rear end of said chassis and the runners mounted under the forward end of same with means of coupling the endless tracks to the runners, certain parts being broken away.

Fig. 2 is a side elevation view of a passenger automobile equipped with endless tracks and runners swung into working position.

Fig. 3 is a side elevation view of an automobile showing the drive mechanism in its normal position out of contact from the ground.

Fig. 4 is a transverse sectional view looking from behind with the endless tracks in position to drive the vehicle.

Fig. 5 is a transverse sectional view of the runners looking from the front showing the manner in which said runners are connected to the steering mechanism of the vehicle.

Fig. 6 is a side view of the drive mechanism in its normal elevated position and the rack and gear device.

Referring to the drawings, wherein for the purpose of illustration is shown a preferred embodiment of the invention, the numeral 1 in Figs. 2 and 3 represent an automobile of a conventional design having the customary frame 14, steering wheels 3, driving wheels 2, axle housings 23 and driving axle shafts 15.

The drive mechanism consists of two endless traction tracks constructed identically and in a manner well known to the art. Whereas each track is constructed, operated, disposed and connected to the vehicle similarly, the description of one track only is sufficient to fully describe the construction and operation of my invention, this also shall apply to the description of the runners.

One of the above mentioned tracks may be generally denoted by the numeral 29 and one of the runners may be generally denoted by the numeral 29a.

The track 29 consists mainly of a horizontal frame 22 having longitudinally extending members 22a at each side thereof. The outer ends of members 22a are provided with suitable bearings (not shown) into which shaft 6 is journaled crosswise thereto. A chain sprocket 21 is keyed upon the outer end of shaft 6, a gear 24, Fig. 4 and Fig. 6 is keyed upon the other end of said shaft 6, a sprocket wheel 19 is centrally located upon said shaft 6 between the inner faces of members 22a. The forward ends of members 22a are provided with longitudinal slots 22b with sliding blocks 22c disposed therein. Another shaft 6a is journaled to said blocks 22c, a wheel 20 of the same diameter as sprocket 19 is centrally located on said shaft 6a between the members 22a. A traction belt 7 whose outer face is provided with projections 7a extends about sprocket 19 and wheel 20. The tension of belt 7 is maintained by coil springs 13a disposed within slots 22b and acting upon sliding blocks 22c.

A clutch assembly, preferably of the multiple disc type 4a, Fig. 4 is securely fixed to the inner side of each rear wheel 2 and is intended to engage sprocket 4 which is freely mounted on a collar 4b projecting inwardly from wheel 2. Two vertical links 8 connect the rear end of track 29 to axle housing 23 and swing about same. Two other vertical links 8a connect the forward end of track 29 to member of vehicle frame 14. The upper ends of links 8 are connected to the outer end of axle housings 23 while their lower ends are connected to shaft 6 on each outer side of frame 22. The upper ends of links 8a are connected to pin 6c and swing thereon while their lower ends are connected to the outer ends of shaft 6a. The links 8a are provided with slots 8b extending from their extreme upper ends to a point near their lower ends. Pins 6c are intended to slide up and down freely within said slots 8b. Coil springs 13 are disposed within slots 8b and act against pins 6c thereby providing a resilient connection between the track 29 and vehicle frame 14.

The front runner attachment 29a consists of snow runner 11 hinged to the lower end of vertical link 10 by pin 17. The upper end of link 10 is connected to pin 17a and intended to swing about same. As pin 17a is fixed to steering knuckle 16 it is clear that the turning of said knuckle in the process of steering the vehicle will cause the runners to turn likewise and thereby steer the vehicle. A hand lever 12 is fulcrumed to pin 12a the lower end of said lever is provided with pins 12c and 12d. A coupling rod 9 couples lever 12 to unit 29 by means of pins 12c and 9a.

Another coupling rod 9c provided with a joint 9b couples hand lever 12 to unit 29a by means of pins 12d and 17b. It will be easily understood that pulling lever 12 backward the units 29 and 29a will be raised and maintained in their normal elevated and neutral position as shown in Figs. 3 and 6. Pushing lever 12 forward the units 29 and 29a will be lowered to their working position as shown in Figs. 1, 2, 4, and 5. Therefore it is clear that the actuating of the two independent units is performed in one operation.

An anchor block 12b holds lever 12 and lever 25 to their desired position. It may be found at times that the hand lever above described is insufficiently powerful to force the drive mechanism to its extreme low position as shown in Figs. 1, 2, 4, and 5 and raise the whole vehicle a certain distance from the ground. Therefore the power of the motor is employed to swing the drive mechanism down to its extreme low position in the following manner.

For summer driving the front runner unit 29a will naturally be removed from the vehicle. This may simply be done in the following manner; slide link 10 off pin 17a and disconnect rod 9c from pin 12d. If desired the track units 29 may also be removed from the vehicle but if the vehicle is operated in a locality where the roads are sometimes in very poor condition it would be preferable to leave the track units attached to the vehicle so that they may be brought to use when the vehicle becomes mired or the wheels begin to slip.

1. To conclude the operation of my invention it may be summarized as follows:—For travelling in the winter season when the roads are covered with snow but in good shape for motor travelling units 29 and 29a are kept in their normally elevated position with sprocket 4 disengaged from wheel 2 causing unit 29 to be motionless.

2. If the driver finds a section of the road to be so deeply covered with snow that it would be almost impossible to pass for a car depending only upon the conventional means of propulsion, the operator a pushes the lever 12 forward, b unit 29 and 29a drops to the ground, c the operator pulls lever 25 backward and automatically d sprocket 4 is engaged to wheel 2, e track unit 29 begins to turn, f rack 18 is meshed with gear 24 and forces units 29 and 29a to their lowest possible point to the extent that the whole vehicle is lifted off the ground and its whole weight is now resting on the above mentioned units, g as unit 29 is now revolving the propulsion of the vehicle is effected by same.

After passing the difficult section of the otherwise good passable road the operator brings again the units 29 and 29a back to their original position by simply reversing the aforesaid order of operation.

For summer driving the manner of operation is the same except that the runner unit 29a has been removed from the vehicle.

While I have herein described a preferable construction of my invention many changes may be made without departing from the spirit of the invention as defined in the appended claim.

I claim:—

In combination with a motor vehicle, an auxiliary drive mechanism, comprising endless propelling tracks arranged beneath the rear end thereof, normally elevated above the ground and capable of a downwardly swinging movement to engage with the ground whereby the propulsion of said motor vehicle may be effected by said endless tracks, vertical links or members connecting the rear ends of said tracks to the rear axle housing of said vehicle, said links being free to swing about said housing, resilient vertical links or members connecting the forward ends of said tracks to a point on the chassis of the said vehicle, said resilient links being free to swing about said point on said chassis, a pair of runners arranged beneath the front end of said vehicle normally elevated above the ground and also capable of a downwardly swinging movement, vertical links or members connecting said runners to a point on the steering mechanism of said vehicle, said links being free to swing about said point on said steering mechanism, means for steering said runners, means for driving said endless tracks, operating means to engage or disengage said means for driving said tracks, manually operable means for moving said tracks downwardly or upwardly and operating means to maintain said tracks in their normally elevated position or lowered working position, power operable means for lowering or raising said tracks, detachable rods coupling aforesaid runners to said tracks whereby the lowering or raising of said tracks may simultaneously cause the runners to be lowered or raised.

HENRY SARRAZIN.

Certificate of Correction

Patent No. 2,051,496. August 18, 1936.

HENRY SARRAZIN

It is hereby certified that errors appear in the printed specification of the above numbered patent requiring correction as follows: Page 2, first column, line 19, beginning with the words "A hand lever" strike out all to and including the reference numeral and period "17b." in line 26, and insert instead the following:

A coupling rod 9 provided with a joint 9b is fastened to pin 17b and to the forward end of track 29 in such a manner that the runner unit 29a and track unit 29 may be swung into or out of the desired position as one and complete unit.

A hand lever 12 fulcrumed to pin 12a is connected at its lower end to rod 9 by means of pin 9a.

Same page and column, after line 44, insert the following:

The above described structure is provided with a vertical movable rack 18 whose forward end is attached and intended to swing about pin 14a fixed to chassis 14 and whose lower face is provided with teeth 18a from a point approximately halfway between its respective ends and extending to within a couple inches of its outer or rear end as shown in Fig. 6, the said rack 18 is intended to be meshed with gear 24 Figs. 4–6 which is disposed at the inner end of shaft 6 and securely fixed thereon.

A hand lever 25 having connections 26, 27, 28, and 28a normally holds rack 18 away from gear 24 Figs. 4–6 and also maintains clutch 4a disengaged from sprocket 4 by means of rod 28a. In this manner the drive wheel may be turning and yet sprocket 4 remains at rest. When said lever 25 is brought backward the rack 18 is lowered to mesh with gear 24 at a point near the forward end of the toothed portion of said rack and the clutch 4a is caused to engage sprocket 4 and cause same to turn with drive wheel 2 which in turn causes sprocket 21 and gear 24 to revolve. Immediately the rack comes in contact with the revolving gear 24 said gear is naturally forced to travel towards the outer end of said rack until it has reached the end of the toothed portion of said rack thereby causing the drive mechanism to swing downward to its working position. If it is desired to raise the mechanism back to its normal position by employing the power of the motor all that is necessary is to put the gear shift into reverse position in this manner gear 24 will travel towards the forward end of rack 18 consequently causing the whole mechanism to swing upward to its normal position; and that the said Letters Patent should be read with these corrections therein that the same may conform to the record of the case in the Patent Office.

Signed and sealed this 15th day of December, A. D. 1936.

[SEAL]

HENRY VAN ARSDALE,
*Acting Commissioner of Patents.*